UNITED STATES PATENT OFFICE.

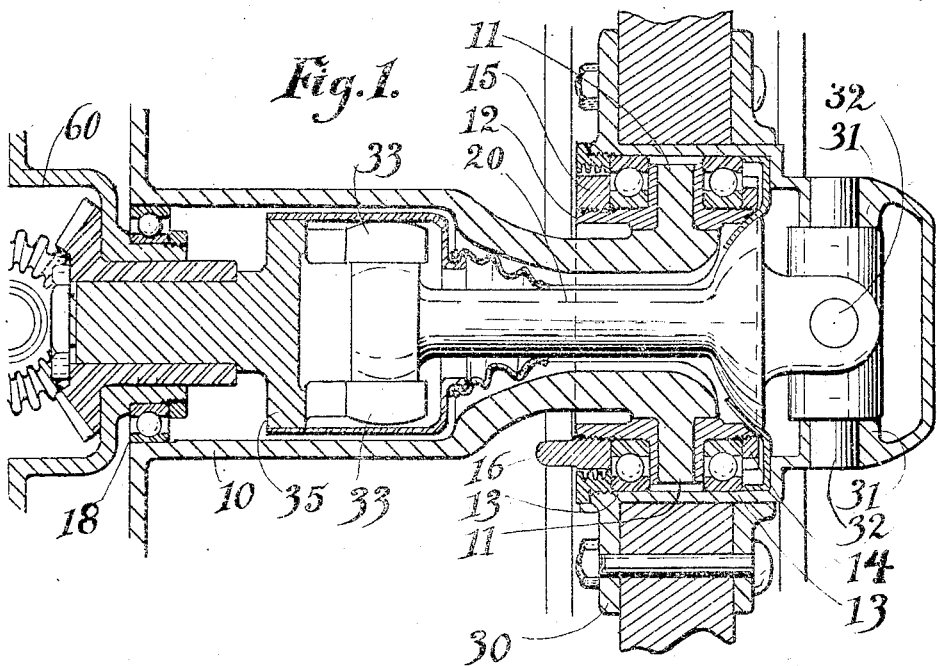
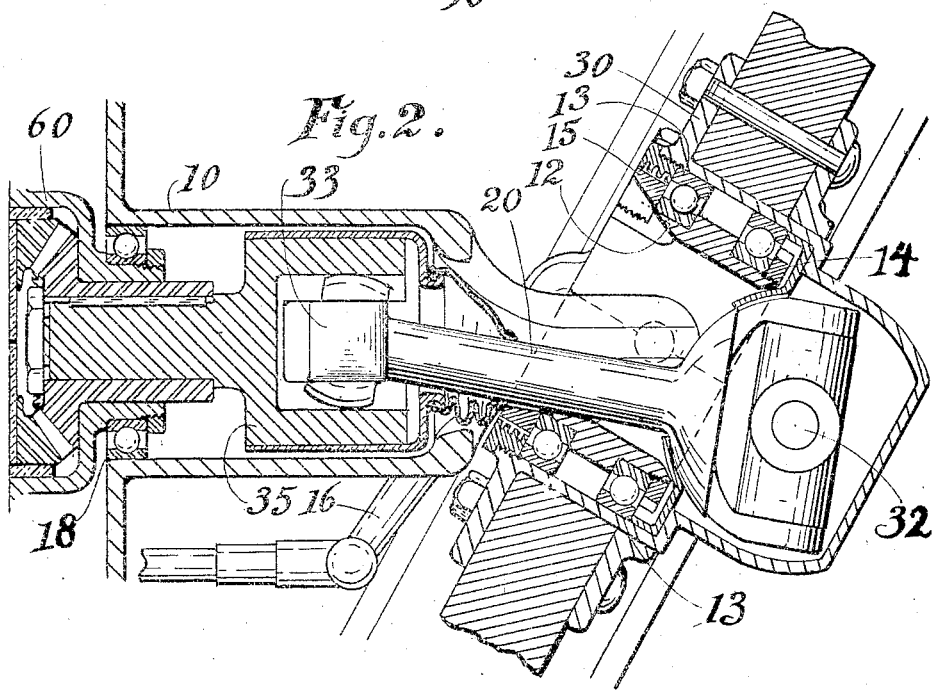

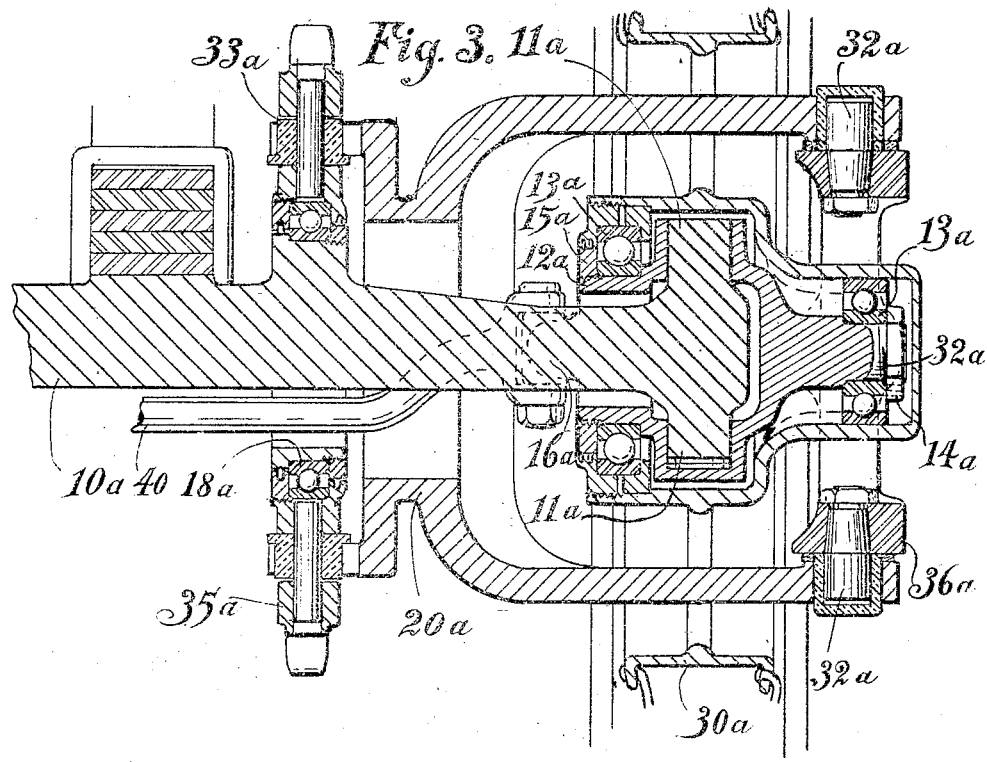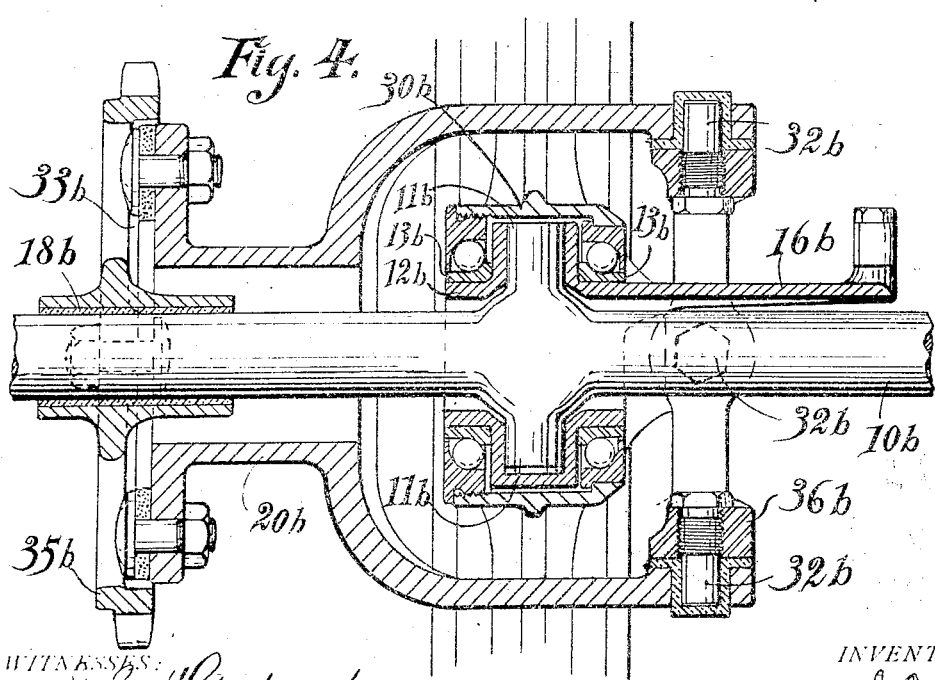

ALDEN E. OSBORN, OF NEW YORK, N. Y.

STEERING-WHEEL-DRIVING MECHANISM.

1,182,928.  Specification of Letters Patent.  Patented May 16, 1916.

Application filed December 15, 1913. Serial No. 806,887.

*To all whom it may concern:*

Be it known that I, ALDEN E. OSBORN, of the city of New York, borough of the Bronx, county and State of New York, have invented certain new and useful Improvements in Steering-Wheel-Driving Mechanism, of which the following is a full, clear, and exact description, such as will enable others skilled in the art to which it appertains to make and use the same.

My invention relates to a method of driving the pivoted steering wheel or wheels of a motor vehicle from a relatively stationary motor on said vehicle and to the method of pivotally mounting such wheel or wheels.

Its principal object is to provide that the maximum angle of working of any of the universal joints employed in my wheel driving system shall be less than the angle at which the wheel or wheels may stand to the axle on which said wheel or wheels are pivotally mounted thus reducing the universal joint friction and wear.

A second object is to provide an extremely simple and cheap wheel mounting means in which the pivot pins may be integral with the axle, (thereby avoiding the weakening of the same by drilling for the pins) and in which also wheel bearings of exceedingly small diameter, in proportion to the axle size, length of pivot pins and degree of steering movement, can be employed.

Reference is to be had to the accompanying drawings in which:—

Figure 1 represents a vertical sectional view of one form of my invention. Fig. 2 represents a horizontal sectional view of the mechanism shown in Fig. 1; Fig. 3 represents a vertical sectional view of a modification of the mechanism shown in Figs. 1 and 2 and Fig. 4 represents a vertical sectional view of a still further modification.

In Figs. 1 and 2 of the accompanying drawings the axle 10 is shown as in the form of a hollow tubular casing which casing surrounds the driving member 20 and is provided with two opposed pivot pins 11 for the wheel support 12. This wheel support 12 is, in order to permit of its being placed in position on the pins 11, divided vertically (as shown by the dotted lines of Fig. 2) and is held together when in place by the bearings 13 which pass over it at each side of the pivot pins 11. The bearings 13 are shown as locked in position on this support by the nut 14 on one side and the nut 15 on the other which latter nut is shown as integral with the steering arm 16 which is arranged, by suitable means, so that its movements can be readily controlled by the operator. The bearings 13 carry the wheel hub 30 which hub has two bosses or arms 31 at one side of the wheel bearings 13—these bosses or arms carrying two of the universal joint pins 32 so that the center of motion of said universal joint will be on the opposite side of the axis of pivoting of the wheel support from that from which the driving member 20 projects. The universal joint may be of any desired type suitable for connecting the driving member 20 and hub 30 although it is shown as of the common crosspin form and is surrounded and protected by a suitable extension or cover on said hub. The driving member 20 is also supported at its other end by a universal or flexible joint which, like the joint just mentioned, may be of any desired form but is shown in these figures as comprising two square sliding blocks 33 pivoted on the member 20 which blocks move in slots in the hollow end of the driving element or shaft 35. This shaft may be driven by the vehicle motor in any desired manner although it is shown as being connected to an element of the usual differential gear 60 which gear is at one side supported by a bearing 18 mounted on the axle 10 and at the other side by a similarly mounted bearing although this is not shown as the construction will be readily understood by those skilled in the art.

From the foregoing it will be seen that owing to the center of motion of the main universal joint connecting the driving member 20 and hub 30 being at one side of the axis of pivoting of the wheel, the turning of said wheel sidewise to steer results in moving the driving member 20 out of line with the axle 10, as shown in Fig. 2, thus causing the angle of the main joint to be less than the angle through which the wheel has been turned and bringing the joint between said member 20 and the driving shaft or part 35 into action. As the efficiency of the main universal joint increases rapidly with a reduction in the working angle the wear and friction is greatly reduced notwithstanding that the secondary universal joint connecting the driving element and driving member is brought into action as the motion in this secondary joint is relatively small.

In Fig. 3 is shown a modification of Figs.

1 and 2 in which the driving member 20ª surrounds the axle 10ª and the driving part 35ª, which in this case is shown as being a sprocket wheel, also surrounds the axle and is mounted on a bearing 18ª upon its exterior. The axle 10ª carries the two opposed pivot pins 11ª on which is mounted the wheel support 12ª which support is divided vertically and is held together by the wheel bearings 13ª and nuts 14ª and 15ª exactly as in Figs. 1 and 2. The nut 15ª is as in Figs. 1 and 2 provided with an arm 16ª, indicated by the dotted lines, connected to the steering mechanism of the vehicle this arm being in this form of my invention arranged to swing within the driving member 20ª and having pivotal connection with the rod 40. The driving member 20ª has two arms which pass through openings in the wheel hub 30ª and pivotally connect with the universal joint ring 36ª which is in turn pivotally mounted on two arms or bosses on the hub at right angles to the axis of the driving member pivots. The other end of the driving member 20ª is connected by a universal or flexible joint to the sprocket 35ª so that the member can swing with the steering movement of the wheel and still have motion transmitted to it from the sprocket. Any form of universal joint may be used although that shown comprises two pivotally mounted blocks or rollers 33ª on the sprocket 35ª which move in slots or grooves in the ends of two arms attached to the driving member 20ª. The action of this form of mechanism whereby the movement in the main universal joint is reduced below that incident to the steering angle of the wheel will be clearly understood by reference to Fig. 2 as the principle is exactly the same.

In the further modification of my invention shown in Fig. 4 the axle 10ᵇ is shown as extending to both sides of wheel hub 30ᵇ with the wheel support 12ᵇ divided vertically and mounted on the pivot pins 11ᵇ as in the other forms. In this view, however, no lock nuts are shown to hold the wheel bearings 13ᵇ in position and the steering arm 16ᵇ is shown as attached to one part of the wheel support 12ᵇ. The driving member 20ᵇ surrounds the axle 10ᵇ and has two arms passing through openings in the wheel hub or between the spokes of the wheel and connecting with the universal joint ring 36ᵇ at the opposite side of the wheel hub, from the driving sprocket 35ᵇ substantially in the same way as in Fig. 3. The universal or flexible joint between this sprocket 35ᵇ and the driving member 20ᵇ is shown in this Fig. 4 as composed of a flexible disk 33ᵇ fastened to two arms on the driving member and fastened at right angles to the first points of attachment to two opposite points on the sprocket. This type of joint permits of only a limited amount of universal action but has the advantage of not containing any pivoted connections. The operation of this form of my invention will, like the foregoing form, be made clear by reference to Fig. 2.

It will be noticed that Fig. 4 shows my invention in a form particularly adapted for three wheel vehicles, as the axle extends to both sides of the wheel, while in the other views it is shown as adapted to four wheel vehicles. It should be understood, however, that certain features of the form shown in Fig. 4 may be used in connection with the types shown in the other figures or certain features of these figures may be used in connection with the three wheel form and also that various other modifications embodying the principles of my invention may be made.

Having thus described my invention, I claim as new and desire to secure by Letters Patent—

1. In a vehicle, the combination with an axle, a rotary driving element and a rotary driving member, of substantially vertical pivot studs fastened to said axle, a longitudinally separable wheel support having sockets therein revolubly fitting about said studs, a means for oscillating said support to steer the vehicle, a wheel rotatably mounted on said support, a universal or flexible joint for connecting the rotary driving member and the wheel, a second universal or flexible joint for connecting the said driving member and the said driving element said second universal joint and driving element being on the opposite side of the axis of movement of said wheel support from the center of motion of said first mentioned universal joint whereby, when said wheel support is turned about the said studs for steering the vehicle, the axis of rotation of the said driving member will assume an angle intermediate between the line of the axis of rotation of the said driving element and the line of the axis of rotation of the wheel.

2. In a vehicle, the combination with an axle, a hollow rotary driving element surrounding said axle and a hollow rotary driving member also surrounding said axle, of a wheel support pivotally mounted on said axle, a wheel rotatably mounted on said support and a universal or flexible joint, having its center of motion at one side of the axis of movement of said pivoted wheel support, for connecting the said driving member and the wheel and means, at the other side of the axis of movement of said pivoted wheel support, for connecting the said driving member with the said driving element.

3. In a vehicle, the combination with an axle, a hollow rotary driving element surrounding said axle and a hollow rotary driving member, also surrounding said axle and having at an end thereof two projecting arms, of a wheel support pivotally mounted on said axle, a wheel rotatably mounted on said support and having openings in its plane through which said two projecting arms of the driving member pass and a universal or flexible joint, having its center of motion at one side of the axis of movement of said pivoted wheel support, connected with said two arms of the driving member and with the wheel and means, at the other side of the axis of movement of said pivoted wheel support, for connecting the said driving member and the said driving element.

4. In a vehicle, the combination with an axle, a hollow rotary driving element surrounding said axle and a hollow rotary driving member, also surrounding said axle and having at an end thereof two projecting arms, of a wheel support pivotally mounted on said axle, a wheel rotatably mounted on said support and having openings in its plane through which said two projecting arms of the driving member pass, a ring, at one side of the axis of movement of said pivoted wheel support, pivotally connected with said two arms of the driving member and pivotally connected, at right angles to the axis of said pivotal connections to said arms, to the wheel, and means at the other side of the axis of movement of said pivoted wheel support, for connecting the said driving member and the said driving element.

5. In a vehicle, the combination with an axle, a hollow rotary driving element surrounding said axle and a hollow rotary driving member, also surrounding said axle, and having at an end thereof two projecting arms, of a wheel support pivotally mounted on said axle with said axle extending beyond both sides thereof, a means for oscillating said support to steer the vehicle, a wheel rotatably mounted on said support and having openings in its plane through which the said two projecting arms of the driving member pass, a ring, also surrounding said axle, pivotally connected with said two arms of driving member and pivotally connected, at right angles to the axis of said pivotal connections to said arms, to the wheel, and means for connecting the said driving member and the said driving element—the said means and the said driving member and element being on the opposite side of the axis of movement of said pivoted wheel support from the said ring.

6. In a vehicle, the combination with an axle of substantially vertical pivot studs on said axle with said axle extending to both sides thereof, a pivotally mounted wheel support having sockets for said studs and being longitudinally separable on a line intersecting said sockets into two or more parts to permit of its said mounting about said studs, rings fitting about the said support at each side of the said pivot studs to hold its parts in position, a wheel rotatably mounted on said support and means for oscillating said support to steer the vehicle.

In testimony whereof I have signed my name to this specification in the presence of two subscribing witnesses.

ALDEN E. OSBORN.

Witnesses:
 OLIVER CONGDON,
 ROBERT CAMSAN.